3,613,476
STEERING COLUMN ASSEMBLIES
Isaiah V. Cunningham, P.O. Box 9337,
South Charleston, W. Va. 25303
Continuation-in-part of application Ser. No. 818,248,
Apr. 22, 1969. This application Aug. 24, 1970,
Ser. No. 66,433
Int. Cl. B62d 1/18
U.S. Cl. 74—492   3 Claims

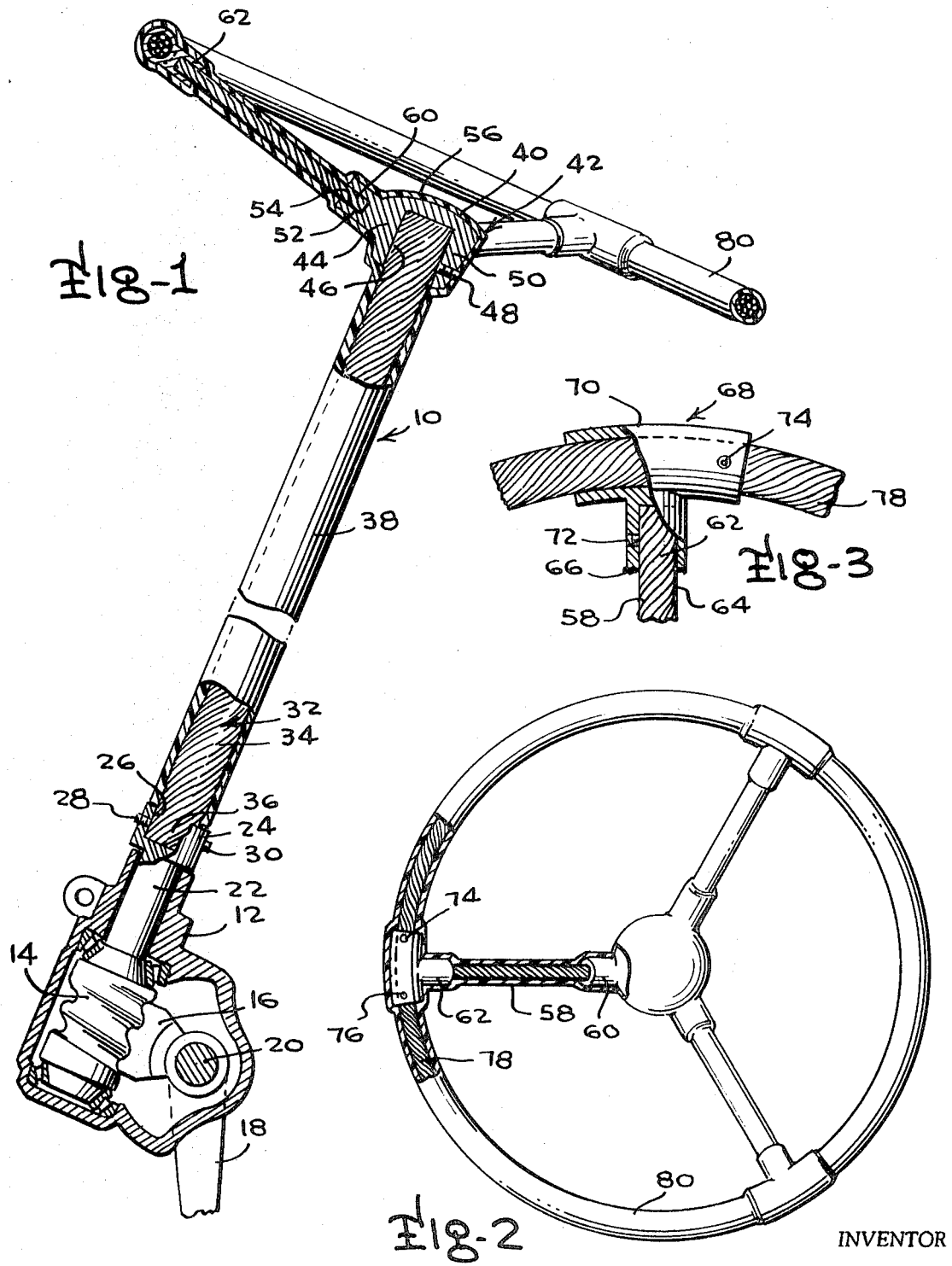

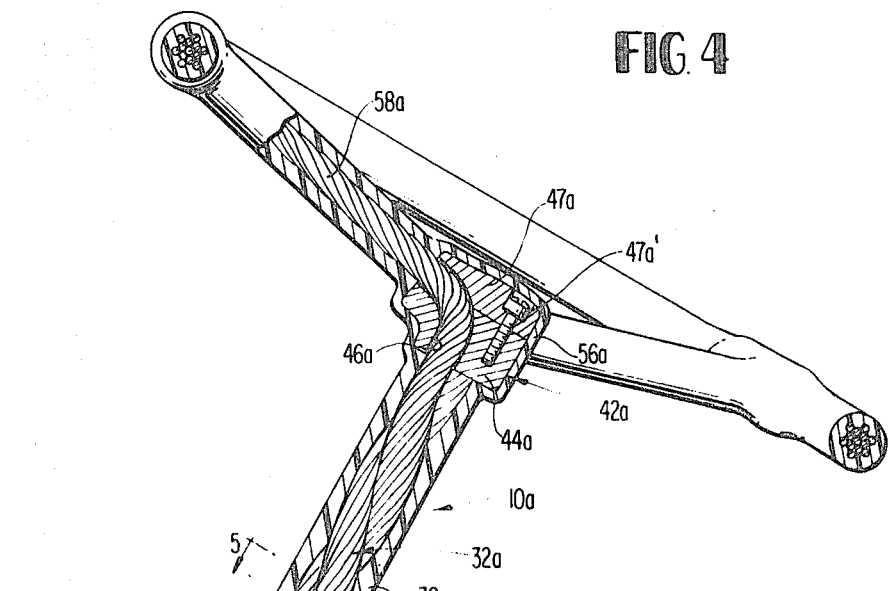
FIG. 4
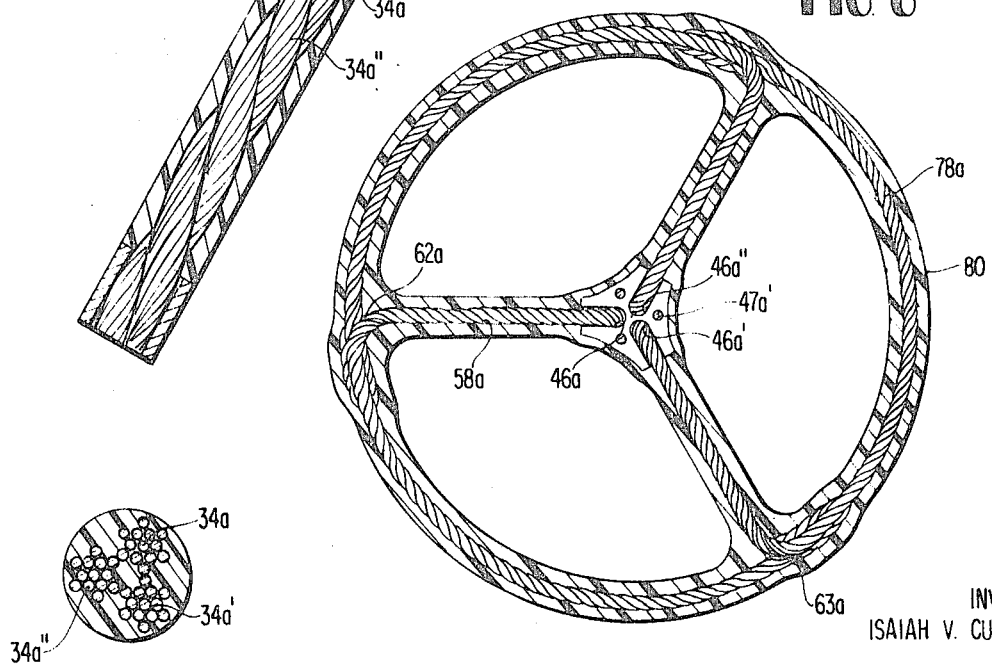
FIG. 5
FIG. 6
INVENTOR
ISAIAH V. CUNNINGHAM
BY
ATTORNEY United States Patent Office 3,613,476
Patented Oct. 19, 1971

ABSTRACT OF THE DISCLOSURE

Steering assemblies comprise columns, wheels and spokes, for motor vehicles or the like and are constructed principally from heavy wire or cable which is flexible upon impact to prevent injuries. The assembly components are coated with plastic.

CROSS-REFERENCE TO RELATED APPLICATION

This application is a continuation-in-part of my prior, copending application Ser. No. 818,248, filed Apr. 22, 1969, now abandoned.

BACKGROUND OF THE INVENTION

(1) Field of the invention

This invention relates to safety steering apparatus for vehicles, specifically to steering assemblies in which the major components are yieldable to minimize the effects of body contact therewith as often occurs in collisions and upon sudden deceleration.

(2) Statement of the prior art

It has heretofore been proposed that steering wheels and steering columns be of collapsible construction whereby they give way upon impact. Previously known assemblies of this type represent advances in the art by comparison with rigid, non-yielding structures, and have recently been introduced commercially on substantial scale. However, objections have arisen with respect to the functional reliability of these devices, and because, when once collapsed as by impact or suddent deceleration, these prior assemblies are thereafter incapacitated for further use. Moreover, collapse of the systems may be effected accidentally, as by a sudden change of direction or braking, and thereafter the vehicle in question is uncontrollable.

SUMMARY OF THE INVENTION

The present invention provides constructions wherein the safety factor of collapsible systems is retained and enhanced, and wherein, unlike collapsible systems, the assemblies retain this essential functional utility even following a severe application of force thereto. It is a principal objective of this invention to provide a steering wheel and column assembly for vehicles in which all major components of the assembly are formed of metallic cable, wire or the like, preferably coated with a plastic or like substance, the cable or wire rope possessing sufficient rigidity to perform conventionally under normal operating circumstances, but being bendable under severe impact to avoid injuries to vehicle operators.

The invention contemplates systems wherein the steering wheel and column assembly are yieldable upon impact, but which do not become inoperative even under extreme conditions of use. This feature makes it possible for an operator to in some instances regain control of a vehicle following severe deceleration or impact, whereas with existing systems all control would be lost.

A related objective of the invention resides in supplying means for the employment of wire rope or cable in the fabrication of the major components of a vehicular steering system.

A further object is to provide steering systems which take advantage of the stress resistance of metallic cable or rope while providing a safety factor.

In a modified form of the invention, a multi-strand main cable is employed in its conventional, braided form as a main component, that is, as the steering column, but is separated into individual strand units to provide spoke and wheel means.

Other and further objects and advantages of the invention will become apparent to those skilled in the art upon consideration of the following specification when read in conjunction with the annexed drawings.

BRIEF DESCRIPTION OF THE DRAWINGS

FIG. 1 is a side elevational view, partially in cross-section for disclosure of details, of the components of a first form of steering system embodying this invention;

FIG. 2 is a plan view, again broken away for disclosure of details;

FIG. 3 is an enlarged, detail view of steering wheel components thereof;

FIG. 4 is a view similar to FIG. 1, showing a modified form of the invention;

FIG. 5 is a sectional view taken substantially on line 5—5 of FIG. 4, looking in the direction of the arrows; and FIG. 6 is a horizontal, medial cross-section through the steering wheel as fabricated in accordance with the second form of the invention.

DESCRIPTION OF THE PREFERRED EMBODIMENTS

Referring to the drawings in more detail, a first form of steering system adaptable to motor vehicles and the like is therein shown and is identified generally by reference character 10 in FIGS. 1 through 3. The system 10 is here shown detached from a vehicle, the particular mounting and necessary bearings being assumed. The system includes a housing 12 having a main gear 14 meshed with a turning gear 16. The gear 16 is connected in a conventional manner to the usual pitman arm 18 through a shaft 20.

Extended from the gear 14 through the housing 12 is a shaft 22 having a fixed, cup-like adapter 24 at its outer end. The adapter has an outwardly opening bore 26 therein, and has a series of threaded openings 28 thereabout to receive setscrews 30. An elongated length of wire rope or cable forms a main steering shaft 32. The shaft 32 is composed of twisted strands 34 of metallic material, and these strands are in turn composed of plural wire elements. The strands 34 are arranged in spiral, interlocked form. Dimensions form no critical feature of the invention, but it is contemplated that the shaft 32 shall be of material on the order to two inches in diameter. The shaft has a lower end 36 disopsed within the bore 26 whereat it is lockingly engaged by the setscrews 30. The sheath or tubular encasement 38 of plastic surrounds the shaft throughout its exposed length, to its top end 40 whcih is free of this casing.

A wheel hub 42 of this invention comprises a body portion 44 having a main bore 46 formed therein which receives the top end 40 of the shaft. The hub has lateral threaded openings 48 therein which receive a series of setscrews 50 to lock the hub to the shaft.

The hub body 44 further includes a plurality of radially arranged side portions 52 each of which has an outwardly opening slot 54 formed therein. The hub has a plastic encasement 56 thereon.

Mounted fixedly in each of the slots 54 is a spoke 58 formed of wire rope and having an inner end 60 and an outer end 62. The spokes each comprise twisted groups 64 of strands of metallic wire, in spiral form, and are normally of reduced diametric size relative to the diameter of the main steering shaft 32. The outer end 62 of each spoke is received in a sleeve 66 of the spoke adapter 68. These adapters, one being provided for each spoke 58, each includes a sleeve 66, and a cross member 70. The cross members are tubular and are curved from end to end. Each sleeve has a series of set screws 72 to lockingly engage the ends 62 of the spokes, and the cross members have set screws 74 and 76 arranged in the segments therein on opposite sides of the sleeves. An annular steering wheel 78 is also formed of the material heretofore described in regard to the spokes, being initially extended through the cross members and having its terminal ends suitably joined within one of the cross members. The pair of set screws 74, 76 prevent movement of the wheel relative to the spokes. As will be observed, the spokes, adapter and wheel are encased in a plastic sheath 80 for appearance, safety and comfort considerations.

FIGS. 4 through 6 disclose a second form of the invention denoted by reference numeral 10a in which a length of wire rope or cable again forms the main steering shaft 32a composed in this instance of three main strands 34a, 34a' and 34a" (FIG. 5). In turn, each of said strands is composed of individual wire elements. This type of wire rope construction is conventional, three strand wire ropes of approximately two inch diameter being commercially available. As in the previously described form of the invention, a plastic sheath 38a encases the shaft throughout its length.

At a location corresponding with the desired inward extent of the main shaft, a wheel hub 42a is mounted. The hub 42a comprises a body portion 44a with three individual, radially disposed bores 46a, 46a', and 46a" formed therein. As shown in FIG. 4, each of these bores extends through the body portion 44a in a path permitting radial disposition therein of the individual rope strands 34a, 34a', and 34a", respectively. The hub includes further a top cap portion 47a shaped to fit over the body portion and the strands, and affixed thereto by changeable fasteners 47a'. The hub is also encased in plastic, as identified by numeral 56a.

The thus unwound and extended strands 34a, 34a' and 34a" project outwardly in radial fashion from the hub and form spokes 58a. At an outer end 62a of each of the spokes, comprising in this instance a bend portion therein, each of the separated strands is arranged in curvilinear form. The curved strand portions have outer ends 63a which are then interwoven with the next adjacent bend portion of the next spoke to form a continuous steering wheel 78a in a plastic encasement 80a.

Insofar as operation is concerned, the assemblies of this invention operate under normal circumstanses in the same manner as any other vehicle steering wheel and shaft assembly. Upon impact, however, or severe deceleration of the vehicle, if the operator comes into contact with the assembly, either by virtue of inertial contact, or by collapse of the forward portion of the vehicle in the direction of the operator, the shaft and wheel are such that injury to the operator is minimized. In the event that the vehicle remains in motion and its forward axle and other steering components are not immobilized, the operator may regain control of the vehile despite this yielding and deformation of the system.

I claim:
1. A collapsible steering assembly comprising an elongated steering shaft having a flexible core of metallic strands twisted together into a substantially circular cross section,
 a hub connnected to one end of said steering shaft,
 a plurality of spokes connected to and extending radially from said hub, each spoke having a flexible core of metallic strands twisted together into a substantially circular cross-section,
 a rim having a flexible core of metallic strands twisted together into a substantially circular cross-section,
 means for attaching said rim to the ends of said spokes which extend from said hub, and
 said means for attaching said rim to the ends of said spokes comprising a plurality of T-shaped adapters of resilient plastic one adapter for each spoke in which the rim is contained in the top of the T while the spoke is connected to the leg of the T.

2. A collapsibe steering assembly as recited in claim 1 wherein the connections of said hub to said shaft, said spokes to said hub, and said spokes to said adapters are all secured by set screws.

3. A collapsible steering assembly comprising an elongated steering shaft having a flexible core of grouped metallic strands twisted together into a substantially circular cross-section,
 a hub connected to one end of said steering shaft,
 a plurality of spokes formed from individual groups of said metallic strands extending radially through said hub, each spoke having a flexible core of metallic strand elements twisted together into a substantially circular cross-section,
 a rim formed of the curvilinear end sections of said individual strand groups twisted together into a substantially circular cross-section, the ends of said strand groups being interwoven whereby the rim is of annnular form, and
 plastic encasement means for said rim.

References Cited

UNITED STATES PATENTS

| | | | |
|---|---|---|---|
| 534,003 | 2/1895 | Pierce | 74—552 X |
| 817,109 | 11/1907 | Coates | 74—493 X |
| 1,142,780 | 6/1915 | Younger | 74—552 |
| 2,596,784 | 5/1952 | Nagin | 74—552 |
| 3,321,996 | 5/1967 | Cardinale | 74—552 |

FOREIGN PATENTS

| | | | |
|---|---|---|---|
| 1,020,948 | 11/1952 | France | 74—492 |

MILTON KAUFMAN, Primary Examiner

U.S. Cl. X.R.

74—552; 180—78